June 14, 1966  C. L. LONG ETAL  3,255,486
IMAGE-FORMING APPARATUS
Filed April 1, 1965  4 Sheets-Sheet 1

INVENTORS
CECIL LOUIS LONG
HERBERT ALBERT TOBIAS
BY William B. Cridlin, Jr.
ATTORNEY

INVENTORS
CECIL LOUIS LONG
HERBERT ALBERT TOBIAS

BY *William B. Cridlin, Jr*

ATTORNEY

United States Patent Office 3,255,486
Patented June 14, 1966

3,255,486
IMAGE-FORMING APPARATUS
Cecil Louis Long, Westfield, and Herbert Albert Tobias, New Brunswick, N.J., assignors to E. I. du Pont de Nemours and Company, Wilmington, Del., a corporation of Delaware
Filed Apr. 1, 1965, Ser. No. 444,749
6 Claims. (Cl. 18—1)

This invention relates to an improved mechanism for forming clear or light-transmitting areas in an opaque pressure-clearable film. More particularly, the invention relates to apparatus for indexing the lateral movement of spaced pressure strokes when they are used to clarify opaque pressure-clearable film.

In Bechtold U.S. Patent 2,957,791, methods are described for selectively clarifying the opaque, pressure-clearable films covered by said patent that include pressing the films against a copper engraving, and placing the film in a typewriter, without an inking ribbon, and typing directly on it. The pressure-clearable film can be placed against type in a proofing press, and the roller passed over the type to produce a clear image of the type in the film. The resultant clear image-bearing elements can then be used as negatives for photoprinting.

Effective and durable machines for selectively clarifying these films have been devised and are disclosed in assignee's U.S. patents, Alles 3,128,498 and 3,128,497.

These machines have a bedplate adapted to support a relief printing form and an opaque, pressure-clearable film in contact with the relief surface of the form. There is a frame member mounted above and suspended across the bedplate that is adapted to hold a multiplicity of spring fingers of small coactive area in contact with the upper surface of the film and press the pressure-clearable surface against the relief surface. Also there are reciprocating means for allowing relative motion of the plate support and the frame member bearing the spring fingers to subject the film to a stroking pressure from the fingers during the motion. Additionally, the machines are provided with means for changing the position of the spring fingers laterally by a predetermined amount to insure overlapping and uniform coverage of the whole surface of the film and underlying type form. Preferably, the machines are provided with a vacuum frame about the form and adapted to hold the pressure-sensitive film in contact with the surface of the relief.

The improved machine that is described in U.S. patent, Alles, 3,128,497 is characterized in that the transverse support block or member that is adapted to hold the yieldable or spring fingers is pivotally mounted, so that it can be tilted about a transverse axis to vary the position of contacting surfaces of the row of fingers above the bedplate or from film contact position.

During the use of these machines, it has been observed that straightforward indexing, i.e., having each successive straight line tracing of the fingers on the film slightly overlap the previous tracing until all the area is clarified, distorts the highlight dot images in a repeat pattern corresponding to the finger spacing. These highlight dot images are reproduced from the relief surface of all types of mounted, metal halftone plates, e.g., zinc, copper, magnesium, etc., plates. The image distortion appears as elongations in the direction of indexing travel, i.e., perpendicular to the line of finger travel.

The cause of the distortion is not exactly known, but it is believed to be related to the movement of the opaque pressure-clearable film with respect to the relief surface in the direction of the indexing. This belief is based on the observation that the discrepancy in dot fidelity occurs at intervals corresponding to the finger spacing. The sidewise film movement is thought to be produced by the thrust or accumulation of thrusts of the previous strokes of the fingers.

A process that alleviates the distortion is disclosed in assignee's copending patent application, Long, Serial No. 356,319, filed March 31, 1964. Basically, that process involves maintaining in contact with the relief surface of a printing form the pressure-sensitive surface of a thin, flexible sheet embodying a stratum of opaque, pressure-clearable material while subjecting the opposite surface of the sheet simultaneously to a unit of equally spaced pressure strokes to form a unit of spaced pressure traces and consecutively applying the unit of pressure strokes until the entire desired relief area has been subjected to at least one pressure stroke, the application of the strokes being characterized by shifting laterally a plurality of times (e.g., 4 to 16 times) in either direction the successive unit so that the pressure traces are displaced from each other farther than the tracing width, and then applying additional unit strokes to complete pressure tracing of the entire desired relief area.

The exact reason this process solves the problem is unknown, but it is thought that this pattern of increasing the distance between successive strokes such that they do not overlap reduces the cumulative effect on the film of the sidewise thrust of the fingers produced when the fingers stroke in a straightforward manner. In the straightforward indexing, after an initial pass of the fingers, the stratum would be tacked to the relief or planar surface in a series of parallel lines with spacings equal to the spacing between fingers. The fingers were then indexed laterally for a distance a little less than width of the clarified trace and another pass made; this was repeated until all the area between the individual fingers were covered. During this operation, it appears that after the initial tracing an unbalanced force was generated at each subsequent clarification pass because one side of the tracing the finger was then making had already been clarified. It is thought that this unbalanced lateral force would shift the non-clarified portion of the stratum a small distance in the direction of indexing as the clarification cycle proceeded. Due to this lateral shifting and slight progressive stretching of the film, the portion of the unclarified film adjacent the initial tracing of a neighboring finger buckles away from the printing form as the finger approaches the last few clarification strokes. The buckling occurs since the film can no longer slip or freely move in the direction of indexing as the adjacent portions of the film have previously been tacked to the printing form by the neighboring finger. Then as the finger strokes the buckled portion, the film moves slightly but freely in the direction of indexing, i.e., perpendicular to the line of finger travel. This movement causes the last row of halftone dots of the relief to be reproduced as distorted circles in the stratum thus creating a streak.

In using the machines described in the Alles patents where the fingers have a tracing width of .002 to .003 inch, it is obvious that the distance between adjacent strokes in the finally clarified film, cannot exceed .002 inch, otherwise uniform clarification cannot be obtained. Thus the above copending process requires that the indexing means initially space the distance between the successive strokes of a finger more than .002–.003 inch apart and also provide for complete coverage of the stratum by clarifying the missed areas with the same or other fingers.

It is an object of this invention to provide a mechanism for obtaining clear, undistorted images in opaque, pressure-clearable film. It is another object to provide a mechanism which will produce images in opaque, pressure-clearable film which are free from highlight dot distortion and streaking. It is another object to provide a mechanism for obtaining clear image reproductions in such a film when reproducing halftone reliefs. A further object is to provide such apparatus which is easy to operate and gives uniform, dependable results. Other objects will appear hereinafter.

These and other objects are accomplished by an image-forming machine comprising: (A) a bedplate adapted to support a relief printing form and an opaque pressure-clearable film in contact with the relief surface; (B) a carriage member having a support block threadably engaged by an indexing shaft and suspended across said bedplate; (C) yieldable fingers of small coactive area adjustably mounted on said support block and adapted to contact with the upper surface of said film and press the film against the relief surface of said printing form; (D) means for providing reciprocating motion between said bedplate and said support block to subject the film to a stroking pressure from said fingers during the motion; and (E) adjusting means for laterally positioning said support member having means for producing constant lateral movement of said support by rotation of said indexing shaft a set amount at the limit of said reciprocating motion and means for creating varying lateral movement of said indexing shaft in varying increments at the limit of said reciprocating motion.

In a preferred embodiment the means for producing the constant movement by rotating the shaft comprise a ratchet affixed to the shaft for coaction with pawl and cam means. The means for producing the variable movement by laterally moving the shaft comprise cam and pawl means for releasing spring loaded positioning discs, said discs designed to produce the desired lateral movement, and means for converting the rotation of said discs into the lateral movement of the indexing shaft.

The invention will now be described with reference to the accompanying drawings which constitute a part of this application and wherein the same reference numbers refer to the same parts throughout the drawings. In the drawings.

Figure 1:
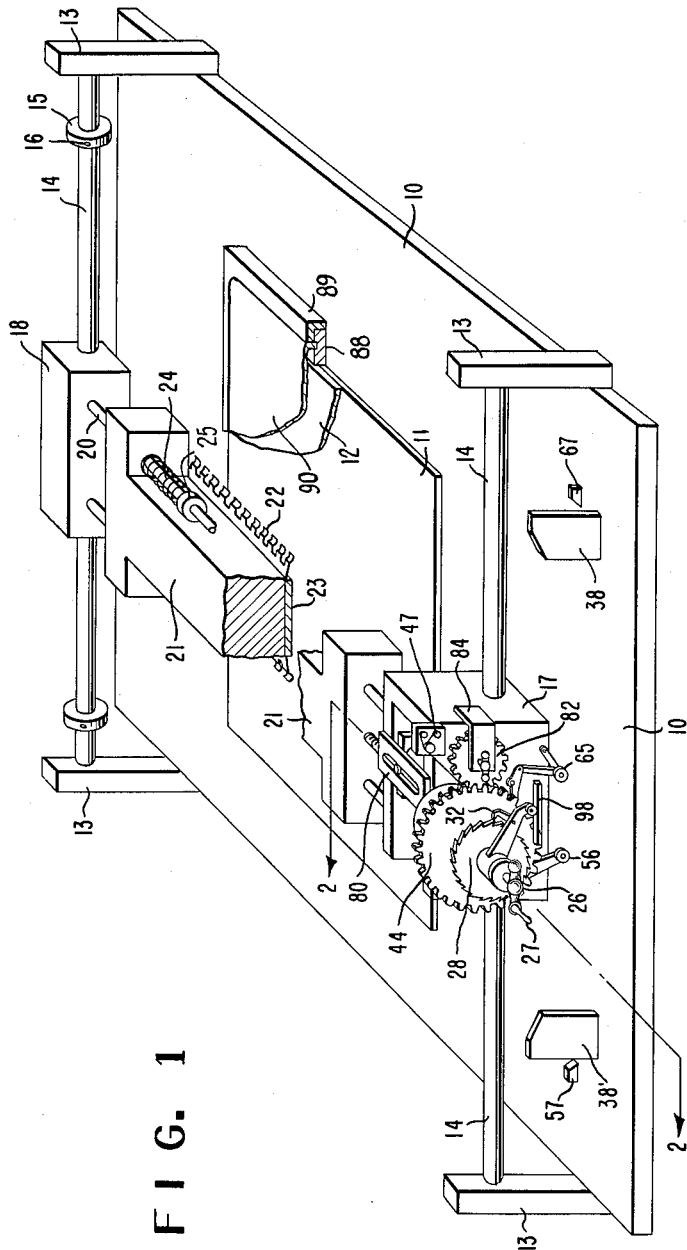
FIG. 1 is an isometric view of one form of the clarifying machine with a printing form in place and parts in broken-away construction.

Reference is now made to FIG. 1 of the drawing which illustrates one practical embodiment of the mechanism of the invention. In this figure the image forming machine comprises a bedplate 10 which carries a relief printing form 11 on which is laid a pressure-clearable film 12. The pressure-clearable film is laid over the relief surface of the printing form with the pressure-clearable stratum in contact with the relief. The pressure-clearable film can be taped to the printing form or to the bedplate by means of any suitable pressure-sensitive sealing tape.

Alternately, the film to be used can be held in place against the relief by vacuum; for example as shown in FIG. 1, a vacuum frame 88 having a suitable sealing gasket 89 can be placed around the printing block. A protective sheet 90 can then be placed over the vacuum frame but is not essential with films having an impervious support. Air can then be withdrawn in the space between the vacuum frame, the printing block and the film or the protective cover sheet in any suitable manner, e.g., by providing suitable connecting passages and hoses or conduits connected to a vacuum pump.

Fastened to the bedplate in any suitable manner are vertical supports 13 which carry guide rails 14 which extend along the sides of the bedplate. These guide rails are provided with suitable stop collars 15 which are fastened to the guide rails by means of set screws 16. Slideably mounted on the guide rails are mounting blocks or members 17 and 18 which are provided with suitable holes 19 that interfit with the guide rails. Extending between and fastened to the mounting blocks are transverse guide rails 20 on which there is slideably mounted a transverse support block or member 21. The unit comprising the mounting blocks 17 and 18, support block 21, and guide rails 20 will be called the carriage for convenience. The bottom surface of the support block is provided with a row of spring fingers 22 which are attached to the support block by means of fastening plate 23 which is held in position by suitable screws. While for simplicity, the machine is illustrated with a double row of offset fingers 22, it is obvious that a single row, or multiple rows of larger number might be employed.

While the contacting area of the spring fingers, i.e., the spherical surface on the spring fingers, may vary in size, surfaces having radii of about .008 to .016 inch are desirable sizes, because these sizes will clarify a .002 to .003 inch width of line and the smaller characters on most relief printing forms are approximately .003 inch in their smallest dimension. The loading on the spring fingers depends upon the characteristics of the opaque, pressure-clearable film. The load required to clarify a typical such film having a pressure-clarifiable layer of about .0005 inch on a .002 inch polyethylene terephthalate base using a .019 inch radius spherical clarification element, is approximately 90 grams in weight. This load will produce substantially minimum optical density. The spring fingers are prestressed to obtain pressure sufficient for clarification; and the depth of penetration below average type height is controlled. On a typical relief printing form, average type height is 0.918 inch±.003 inch; and, conveniently, the penetration of the fingers should be from .010 inch to .005 inch below average type height for satisfactory operation.

The guide rails 20 are provided with compression springs 24 which surround the rails and press against the inner face of the support block 21 and collars 25 that are fastened to the guide rails by set screws. These springs create a force against the support block 21 and push it in the direction perpendicular to guide rails 14. In this instance the force would push the support toward block 18.

Figure 2:
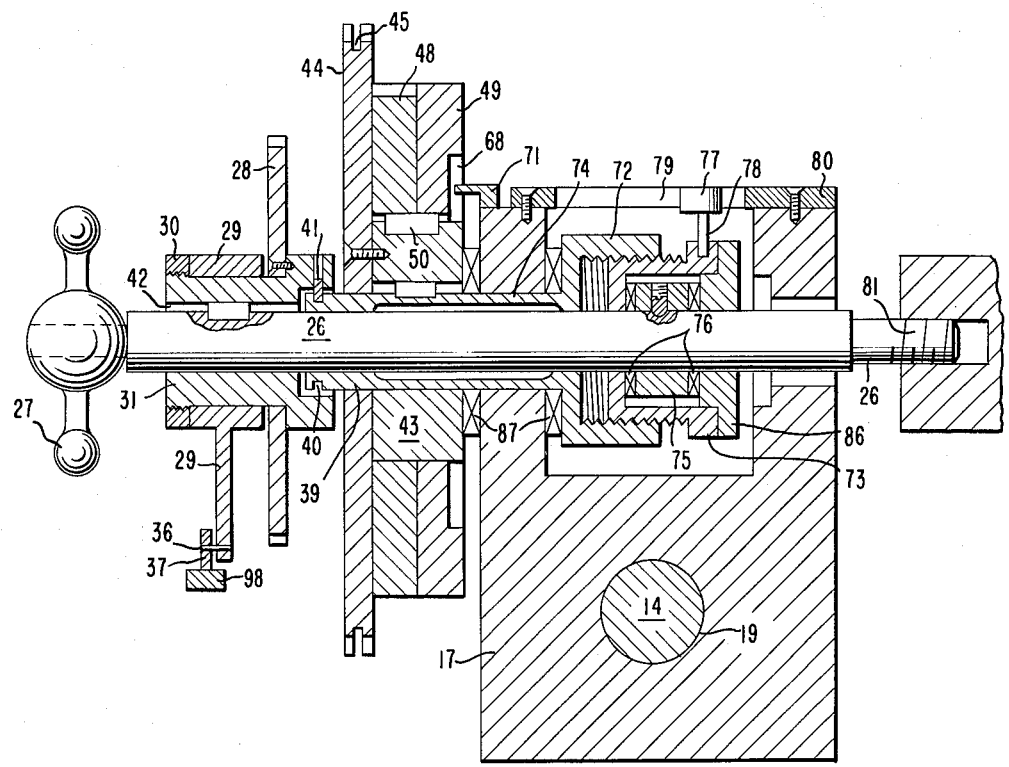
FIG. 2 is a side elevation along lines 2—2 of FIG. 1 of the adjusting or indexing means with parts in section.
Figure 3:
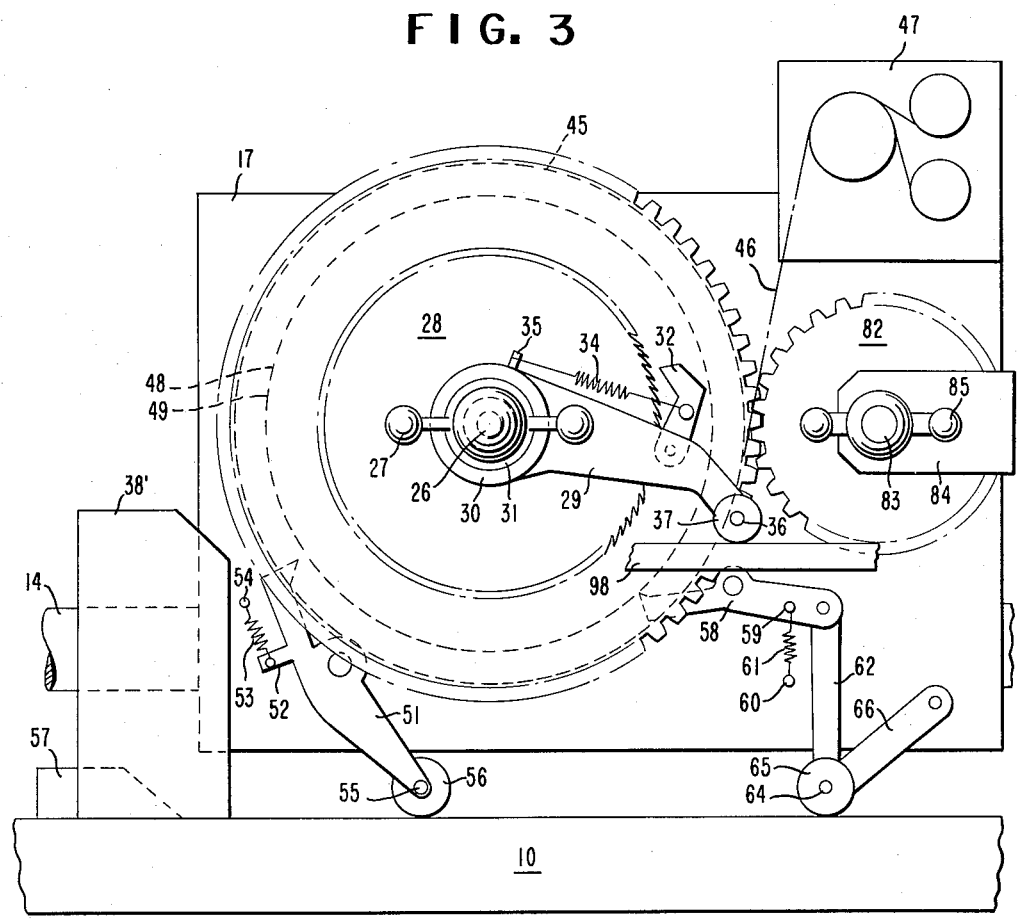
FIG. 3 is a front elevation of the indexing means.

The means for adjusting the lateral location of the support block 21 is adjacent and journalled through mounting block 17, and this means is shown in more detail in FIG. 2 and FIG. 3. A suitable indexing shaft 26 has its inner end threaded for threadable engagement with the support block 21. The opposite or outer end of this shaft is smooth and a crank handle 27 is suitably fastened to this end.

Keyed to and located near the outer end of the indexing shaft 26 is a hub 31 to which a ratchet 28 is affixed. The keyway 42 is a slot that extends the length of the hub such that the hub and indexing shaft will rotate together and the shaft can move laterally with respect to the hub. Pivotally mounted on the hub is the inner end of a cam arm 29, which is held in place by a collar 30 that is affixed to the hub. A pawl 32 is pivotally mounted on the cam arm; the pawl engages the ratchet wheel 28. The pawl 32 has a spring pintle 33 affixed to it, and a spring 34 is mounted between this pintle and another pintle 35 fastened to the cam arm 29. The outer end of the cam arm has a pintle 36 on which is journalled a cam follower 37. This cam follower or roller is adapted to engage with the surfaces of cams 38 and 38′ (shown in FIG. 1) which are mounted on the bedplate 10 at the limits of carriage movement. Cam arm 29 is supported by bar 98 between the two cam surfaces 38 and 38′. The cams can be fastened to the bedplate in any suitable manner, e.g., by means of threaded bolts (not shown).

A sleeve 39 is rotatably mounted on the indexing shaft 26. One end of the sleeve, i.e., the outer end, has a circular groove 40 within which a key 41 fits. This key is affixed within a slot in hub 31. The design of the groove 40 and key 41 are such that either the hub 31 or sleeve 39 can rotate independently of each other while there the lateral location with respect to each other always remains fixed. A second hub 43 is keyed to the sleeve 39 such that they will rotate together. Affixed to the hub 43 by machine screws is a drive gear 44. This gear has a groove 45 around its circumference within which a cable 46 is located. One end of the cable is attached to the drive gear by suitable means, e.g., the cable is inserted within a hole drilled in the gear and soldered in place. The other end of the cable 46 is connected to a negator spring motor 47, which is mounted on block 17.

Figure 4:
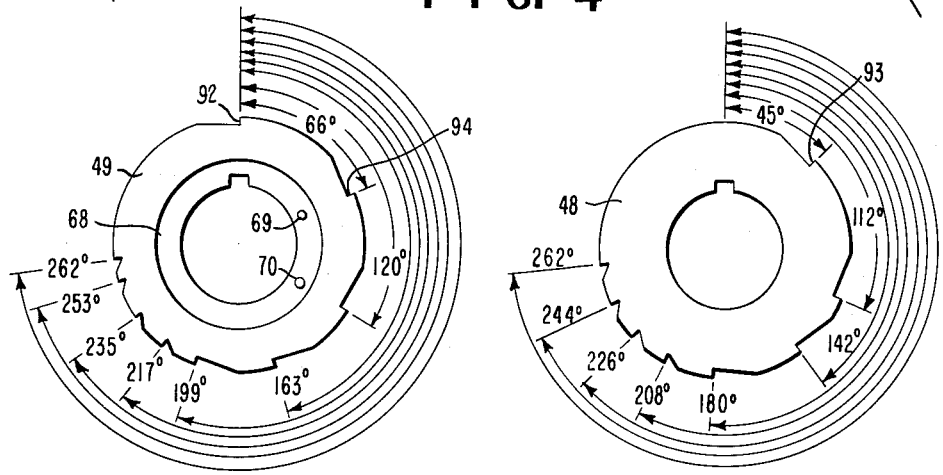
FIG. 4 is a front view of exemplary positioning discs for use with the indexing means.

Two positioning discs 48 and 49 are mounted for rotation with the hub 43 by a suitable key 50. The design of these discs is illustrated in FIG. 4 and will be explained later. It is sufficient for the moment to say that their design, i.e., the spacing of their notches determines the non-rotational, lateral movement of the indexing shaft 26. The outer face of positioning disc 49 has a groove 68 within which pins 69 and 70 (see FIG. 4) are located. These pins limit the rotation of discs 49, 48 and the drive gear 44 to less than one complete revolution by coaction with a stop block 71 affixed to mounting block 17.

Pivotally mounted on mounting block 17 is a pawl 51; this pawl engages positioning disc 49. The pawl 51 has a spring pintle 52 affixed to it, and a spring 53 is mounted between this pintle and another pintle 54 fastened to the mounting block 17. The other end of the pawl has a pintle 55 on which is journalled a cam follower 56. This cam follower is adapted to engage with the surface of cam 57, which is located on the bedplate 10.

Another pawl 58 engages positioning disc 48. This pawl 58 is pivotally mounted on mounting block 17. A spring 61 is mounted between a pintle 59 on the pawl and a pintle 60 on the mounting block. The pawl 58 is linked to a linking arm 62 by a suitable pin 63. The linking arm 62 has a pintle 64 on which is journalled a cam follower 65 and another linking arm 66. The linking arm 66 is pivotally attached to the mounting block 17. Cam follower 65 is adapted to engage with the surface of cam 67 (shown in FIG. 1) located on the bedplate. In operation when follower 65 rides over cam 67, linking arm 62 is raised thus disengaging pawl 58 from a notch on disc 48.

Sleeve 39 is journalled in the mounting block, such that it and also shaft 26 can rotate with respect to the block. Needle thrust bearings 87 are located on both sides of the bored hole 74 in the block. The inner end 72 of the sleeve 39 is bored and threaded. Threadably engaged with the sleeve end 72 is a nut 73. This nut is rotatably mounted on the indexing shaft. A collar 86 is also rotatably mounted on the shaft adjacent the nut. Within the interior of the nut is another collar 75 that is affixed to the indexing shaft 26 by suitable means such as a set screw. Needle thrust bearings 76 located on each side of collar 75 permit collar 75 to rotate with the shaft 26 while nut 73 and collar 86 remain stationary. A roller bearing 77 is mounted on a shaft 78 that is affixed to the top of the nut 73. The roller bearing 77 rides in a slot 79 in a guide member 80 that is attached to the mounting block 17 by machine screws.

With the above combination, when sleeve 39 is rotated, nut 73 is screwed in and out of the threaded end 72 of the sleeve. The nut is prevented from rotating by the bearing 77 riding within the slot 79. The collar 75 within the nut is moved laterally by the nut and since it is attached to the indexing shaft it moves the shaft laterally without rotation. Thus the rotational movement of sleeve 39 is converted into lateral non-rotational movement of the indexing shaft. When the shaft is rotated, e.g., by the crank handle 27, sleeve 39 and nut 73 will remain stationary, only the attached collar 75 and the hub 31 rotate with the indexing shaft.

The indexing shaft 26 is journalled through the mounting block 17 and its threaded end is engaged in the support member 21. When the shaft is rotated, the rotation of its threaded end within the threaded hole 81 of the support member 21 causes lateral movement of the support member, i.e., the support member cannot rotate because of the guide shafts 20. When the shaft 26 is moved laterally by the action of sleeve 39, nut 73, and collar 75, this movement is also imparted to support member 21. In operation, both the rotational lateral movement and the non-rotational lateral movement of support member 21 can occur simultaneously.

Engaging the drive gear 44 is another gear 82. This gear is affixed to a shaft 83 that is journalled into the mounting block 17 and a frame member 84. To the outer end of the shaft 83 another crank handle 85 is affixed by suitable means, e.g., press fit, key, etc. Thus when crank handle 85 is rotated to the left as shown in FIG. 3 (counter clockwise), the drive gear 44 is rotated clockwise. The clockwise movement of the drive gear wraps the cable 46 around the groove 45 and creates a load or stress on the spring motor 47. The load on the spring motor tends to act on the drive gear through the cable to rotate the gear in the counter clockwise direction. However, either pawl 51 or 58 being engaged in a notch on the positioning discs 48 and 49, which are attached to the gear, prevent this counter clockwise movement.

To fully understand the design of the positioning discs 48 and 49 (an exemplary design is set forth in FIG. 4), the operation of the clarifying machine must be considered. In operation, after the film has been mounted on the relief surface, the spring fingers 22 are adjusted to the desired height, so that their bottom actuating surface presses against the pressure-clearable film or protective sheet with the desired amount of pressure. This may vary somewhat depending on the nature of the surface of the relief. It may differ with halftones and line or type matter.

The indexing means is then initially adjusted by rotating crank handle 85 and coacting gear 82 in the counter clockwise direction (as viewed in FIG. 3). Rotation of gear 82 will rotate drive gear 44 in the clockwise direction. This rotation is imparted to discs 48 and 49 as they are affixed to the same hub 43 as the drive gear 44. The rotation continues until it is stopped by pin 70 meeting stop block 71. At this point, pawl 51 will be engaged with the initial notch 92 in disc 49, thus preventing counter clockwise rotation of disc 49 and all the members attached thereto. This rotation, by the coaction of threaded end 72 of the sleeve 39 and nut 73, has moved the transverse support member 21 toward mounting block 17, thus compressing springs 24. The rotation has also wrapped cable 46 on the drive gear thus creating a force in the spring motor 47 that desires to rotate the drive gear counter clockwise.

The initial position of the transverse support block is then adjusted by turning the indexing shaft by means of crank handle 27.

The carriage is then actuated to and fro on the guide rails 14, either manually or by mechanical reciprocating means. As the carriage is reciprocated, the bottom surfaces of the spring fingers will have a stroking action on the pressure-clearable film 12. The carriage can be actuated by hand or can be actuated automatically by means of hydraulic cylinders or reversible motors suitably connected to the frame, e.g., by a loop chain drive so that it can be reciprocated back and forth along the guide rails.

At each limit of carriage travel, two operations occur simultaneously. First, cam follower 37 will engage cam 38 or cam 38′ to actuate pawl 32. Pawl 32 will rotate ratchet wheel 28 and thereby rotate the indexing shaft 26. This rotation of the shaft will move the transverse support block 21 laterally, toward mounting block 18, a distance dependent upon the pitch of the threaded end of the indexing shaft and the ratchet wheel 28 design.

Secondly, at one limit of travel, e.g., the left end as viewed in FIG. 1, another operation takes place. Cam follower 56 will engage cam 57 to release pawl 51 from notch 92 in disc 49. When this occurs, the positioning discs 48 and 49 will rotate counter clockwise due to the force created by the spring motor 47. The distance the discs will rotate is dependent upon the location of the notches on the discs, i.e., once released the discs will rotate until a notch is engaged with either pawl 51 or pawl 58. At the right end of the machine, cam follower 65 and cam 67 coact in a similar manner to release pawl 58 from a notch in disc 48.

Thus it can be observed that the discs should be designed so that they operate in sequence, e.g., initially as illustrated in FIG. 4 pawl 51 engages notch 92 in disc 49 while pawl 58 is not engaged. When pawl 51 is released by cam follower 56 and cam 57 the discs will rotate until pawl 58 engages notch 93 in disc 48. When the carriage reverses its direction and cam follower 64 rides over cam 67, pawl 58 is released. Then the discs will rotate until pawl 51 engages notch 94 in disc 49, and this alternating operation continues until the rotation is stopped by pin 69 meeting stop block 71.

Since discs 48 and 49 are fixed to sleeve 39, their rotation will rotate the sleeve. The rotation of the sleeve will produce lateral movement of the transverse support member 21 in the direction toward mounting block 18 as previously explained. The amount of lateral movement is dependent upon the amount of rotation which is in turn dependent upon the spacing of the notches on discs 48 and 49.

The notch spacing is basically dependent upon the parameters of the fingers 22 and the desired sequence of lateral movement. In an exemplary operation, the distance between the strokes produced by adjacent fingers is 0.032 inch and the width of a tracing produced by one finger is 0.002 inch. Thus at least 16 passes are required to completely cover the area between two adjacent fingers. The preferred sequence of balance clarification is that each subsequent stroke of the finger halve the distance between the previous lines so that the finger spacing is split into halves, quarters, eighths, etc. until the film is completely clarified. Additionally, since the transverse support member moves only in one direction, i.e., toward member 18, there must be interweaving of several fingers. This arrangement has an advantage in that the force applied to the film is balanced during most of the clarification, therefore, there is no progressive shifting of the film in the direction of indexing and no distortion of halftone dots during the final few strokes of clarification.

Figure 5:
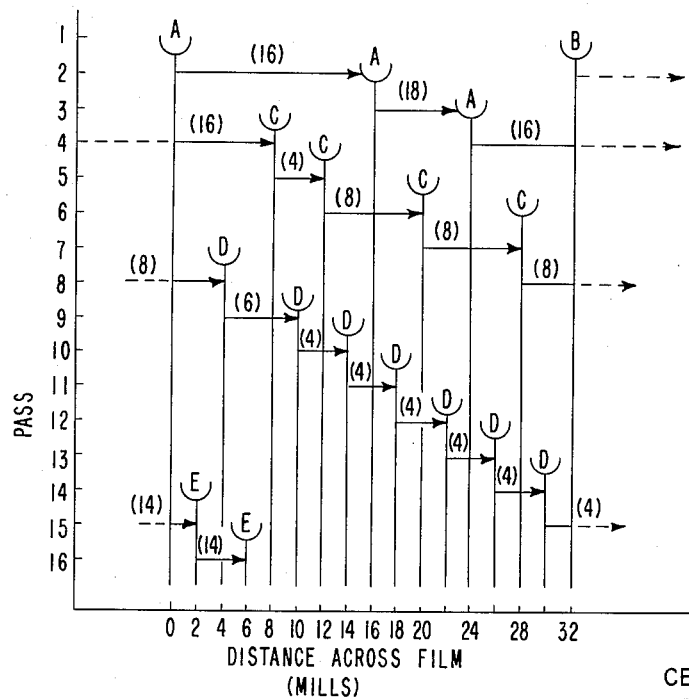
FIG. 5 is a schematic representation illustrating the sequence of pressure tracings produced by a preferred embodiment of the invention.

FIG. 5, illustrates a possible sequence, for the above environment, e.g., finger spacing of 0.032 inch, tracing width 0.002 inch, 16 passes, and the interweaving of 4 fingers. In this schematic representation A and B represent neighboring fingers spaced 0.032 inch apart. The initial pass produces the tracings indicated under lines A and B. At the end of carriage travel, the position of the support member is adjusted by the indexing means and the second pass is 0.016 inch from the initial one, thus halving the distance between the initial strokes. The third pass again halves the distance, i.e., divides one of the 0.016 halves into 0.008 quarters. On the fourth pass finger A moves outside the space between the initial tracings, however finger C halves the other 0.016 half into quarters. The operation continues as indicated until 16 passes have been completed, each pass moving the support member the distance in mils indicated. At this time, stop 70 will prevent any further rotation of the discs, thus no further lateral movement of the indexing shaft due to these discs occurs. However, the indexing shaft can still be rotated by the ratchet 28 and pawl 32 device to continue a fixed, non-varying indexing, i.e., the ratchet and pawl can index the support member 0.002 inch at each reversal. This further indexing can be used if it is necessary to completely clarify the film 12 or to improve the optical density.

FIG. 4 shows the angular spacing of the notches for the above sequence. It must be remembered that these notches do not provide for the entire movement of the transverse support block at the limit of carriage travel, i.e., the ratchet 28 and pawl 32 device also produce some lateral movement. Thus if the ratchet 28 and pawl 32 produce a 0.002 inch movement at each limit of travel, the notches of ratchets 48 and 49 will produce the further movement necessary, e.g., on pass 2 they would produce a movement of 0.014 inch, on pass 3 they would produce a movement of 0.006 inch, on pass 13 they would produce a movement of 0.002 inch, etc.

The machine described above can be improved in that the transverse support block for the spring fingers can be pivotally mounted such that it can be tilted from its normal longitudinal vertical axis, as described in U.S. patent, Alles, 3,128,497. This improved machine operates in two cycles, a tacking cycle, i.e., light pressure is applied partially to produce a low degree of embossing, and then the clarification cycle.

The various structural parts of the machines described can be made of conventional materials of construction. For most of the members and parts, steel, steel alloys, brass, aluminum, aluminum alloys, and high strength plastics, e.g., polyacetal resins, glass fibre laminates, nylon, etc., may be employed. For the spring fingers, it is preferred to use hardened beryllium copper, but Phosphor bronze, spring steel, etc. may be employed. The wearing surface of the fingers may be plated or coated with hard, abrasion-resistant materials, e.g., chromium, rhodium, tungsten carbide, stellite, etc. The base plate, mounting blocks, corner supporting members and transverse blocks, etc. can be made of cast iron or die cast aluminum.

All types of opaque pressure-clearable films can be used in the apparatus of this invention. As previously stated, some suitable pressure-clearable films are described in Bechtold U.S. Patent 2,957,791. Other useful supported and unsupported pressure-clearable films are described in U.S. Patents 2,846,727, 2,848,752, Belgian Patent No. 599,353, and U.S. patent application, Stevenson, Serial No. 176,134, filed February 27, 1962.

The opaque, pressure-clearable films described in Bechtold U.S. Patent 2,957,791 and in the Bechtold patents referred to therein, have also been called opaque, pressure-clarifiable or pressure-coalescible films, but are more aptly termed opaque, pressure-clearable films since the opaque areas which are highly opaque are converted by means of pressure into clear areas readily transparent to visible light. The films are also clearable by heat and by heat and pressure.

The pressure-clearable films or coatings of the Bechtold patents which constitute preferred materials for use in this invention are porous, opaque, non-fibrous, of low bulk density and are composed of partially coalesced discrete particles of a hydrophobic organic addition polymer having a wholly carbon chain, a molecular weight of at least 10,000 and being taken from the group consisting of vinyl and vinylidene addition polymers, said film having an open-cell structure characterized by microscopic voids communicating with the surface and containing 20% to 80% by volume of open-cell pores, said film having a permeability to water vapor of at least 10 times greater than that of corresponding non-porous films of the same polymer and thickness, the opacity per unit of thickness being such that a film thickness of 3 mils and greater has a light-transmission of less than 10% at 4000 A., and increased light-transmission at longer wave lengths of light, said film being capable of sustaining a permanent reduction in thickness of at least 20% together with substantial clarification of opaqueness under a pressure of 10,000 pounds per square inch at room temperature. These films are more fully described and defined in Bechtold U.S. Patent 2,957,791 which constitutes part of this disclosure.

After the clarified, or clear, images are formed in the opaque, pressure-clearable films by using the machines of this invention, the opaque background areas can be increased in optical density by deposition of opaque material in such areas to provide a high-contrast image-bearing layer. These areas being porous are readily coated or impregnated with colorants which fill the open cell voids. Any of the post-densification procedures described in Belgian Patent No. 599,353 can be used. Thus, the selectively clarified coating can be post-densified in unchanged opaque background areas by in situ deposition of lead sulfide at 50° C. by immersing the coating in aqueous lead nitrate and sodium sulfide solutions with intermediate blotting with porous cardboard, washing in water and drying which gives a dense, black background. Alternatively, the background areas can be post-densified by dyeing for several minutes with 2.5% aqueous solution of an after-chromed dye, Colour Index No. 15710, at 50° C. for several minutes.

The invention has the advantage that it produces a clear and transparent image when a printing form is reproduced with pressure-clearable film and it is particularly advantageous when forming a clear image of a halftone printing form or plate.

The invention also has the advantage in that after the initial clarification cycle has been completed, additional cycles of straightforward indexing can be accomplished for complete clarification without any streaking problems. This advantage is made possible by the provision of two separate and independent motions for the indexing means, i.e., rotational movement and lateral movement.

What is claimed is:

1. An image-forming apparatus comprising: (A) a bedplate adapted to support a relief printing form and an opaque pressure-clearable film in contact with the relief surface; (B) a carriage member having a support block threadably engaged by an indexing shaft and suspended across said bedplate; (C) yieldable fingers of small coactive area adjustably mounted on said support block and adapted to contact with the upper surface of said film and press the film against the relief surface of said printing form; (D) means for providing reciprocating motion between said bedplate and said support block to subject the film to a stroking pressure from said fingers during the motion; and (E) adjusting means for laterally positioning said support member having means for producing constant lateral movement of said support by rotation of said indexing shaft a set amount at the limit of said reciprocating motion and means for creating varying lateral movement of said indexing shaft in varying increments at the limit of said reciprocating motion.

2. An image-forming apparatus as described in claim 1 where said means for producing constant lateral movement has a ratchet secured to said indexing shaft and a cam initiated pawl to motivate said ratchet.

3. An image-forming apparatus as described in claim 1 where said means for creating varying lateral movement comprises two positioning discs secured to a sleeve surrounding said indexing shaft, said discs cooperating in their respective movements whereby only one disc at a time is engaged by a pawl.

4. An image-forming apparatus comprising: (A) a bedplate adapted to support a relief printing form and an opaque pressure-clearable film in contact with the relief surface; (B) a carriage member having a support block threadably engaged by an indexing shaft and suspended across said bedplate; (C) at least one row of yieldable fingers of small coactive area adjustably mounted on said support block and adapted to contact with the upper surface of said film and press the film against the relief surface of said printing form; (D) means for providing reciprocating motion between said bedplate and said support block to subject the film to a stroking pressure from said fingers during the motion; (E) a ratchet secured to said indexing shaft, said ratchet being motivated by a pawl which is initiated by a cam on the surface of said bedplate; (F) a pair of spring loaded positioning discs secured to a freely rotatable sleeve surrounding said indexing shaft, said discs being designed to rotate a set amount upon being released by a pawl, and (G) means for converting the rotation of said discs into the lateral movement of said indexing shaft.

5. In an image-forming apparatus for preparing image reproductions on pressure-clearable film said apparatus having a bedplate to support a relief surface and said film, a carriage member having a support suspended on an indexing shaft traverse to said bedplate, yieldable fingers attached to said support for contacting said film and means for providing reciprocating motion between said bedplate and said support, the improvement which comprises adjusting means for laterally positioning said support having means for moving said support repeatedly for the same distance by rotating said indexing shaft and means for moving said support in varying lateral increments both of said lateral movements being independent of one another.

6. An improved apparatus as defined in claim 5 where both of said means for lateral movement are initiated by separate cams attached to said bedplate.

References Cited by the Examiner

UNITED STATES PATENTS 3,128,497 4/1964 Alles.
3,128,498 4/1964 Alles.

WILLIAM J. STEPHENSON, *Primary Examiner.*